United States Patent [19]

Cole et al.

[11] 4,311,85:
[45] Jan. 19, 198

[54] FLAMEPROOFING AGENTS

[75] Inventors: Robert Cole, Dudley; James E. Stephenson, Birmingham, both of England

[73] Assignee: Albright & Wilson Ltd., Oldbury, England

[21] Appl. No.: 115,194

[22] Filed: Jan. 25, 1980

[30] Foreign Application Priority Data

Jan. 26, 1979 [GB] United Kingdom ............... 02828/79

[51] Int. Cl.$^3$ ...................... C07C 127/00; B05D 3/02; C09D 5/16; C09D 5/18
[52] U.S. Cl. .................................. 564/12; 106/18.17; 106/18.19; 252/608; 427/393.3; 564/15
[58] Field of Search ................ 564/12, 15; 427/393.3; 106/18.19, 18.17; 252/8.1

[56] References Cited

U.S. PATENT DOCUMENTS

| | | | |
|---|---|---|---|
| 3,755,457 | 8/1973 | Carlson | 568/11 |
| 3,775,155 | 11/1973 | Eggenweiler et al. | 427/374.1 |
| 3,878,245 | 4/1975 | Nachbar et al. | 564/15 |
| 3,932,502 | 1/1976 | Nachbar et al. | 564/15 |
| 3,994,971 | 11/1976 | Nachbar et al. | 564/15 |
| 4,110,509 | 8/1978 | Roth | 428/276 |

FOREIGN PATENT DOCUMENTS

| | | |
|---|---|---|
| 2213994 | 9/1972 | Fed. Rep. of Germany . |
| 2709878 | 9/1977 | Fed. Rep. of Germany . |
| 882993 | 11/1961 | United Kingdom . |
| 906314 | 9/1962 | United Kingdom . |
| 938989 | 10/1963 | United Kingdom . |
| 1396146 | 3/1973 | United Kingdom . |
| 1439607 | 6/1976 | United Kingdom . |
| 1453296 | 10/1976 | United Kingdom . |
| 1519017 | 7/1978 | United Kingdom . |
| 230774 | 3/1969 | U.S.S.R. . |

*Primary Examiner*—Michael R. Lusignan
*Attorney, Agent, or Firm*—Frishauf, Holtz, Goodman & Woodward

[57] ABSTRACT

An improved process for manufacturing tetrakis (hydroxymethyl) phosphonium amide condensation product without the formation of a precipitate. Urea or thic urea is added to the tetrakis (hydroxymethyl) phosphonium salt having an anion formed from a dibasic o tribasic or polybasic acid. The said salt is in aqueou solution. The pH of the aqueous solution of said salt i adjusted to the range of 4–6.5 when the urea or thioure is added to the salt. The proportion of said salt to sai urea or thiourea is 1:0.05–0.5 (molar). The sulphuri acid salt is preferred. The process produces an im proved aqueous product substantially free of insoluble 23 Claims, No Drawings

FLAMEPROOFING AGENTS

This invention relates to a process for the manufacture of phosphorus-containing condensation products, the products of this process and a process for flameproofing textiles using these products. The term flameproofing as used herein means a treatment which imparts flame retardance notwithstanding that it may not completely inhibit all flame formation. It is known that certain condensation products derived from tetrakis (hydroxymethyl) phosphonium compounds may be used as flameproofing agents, in particular for the treatment of textile fibres e.g. cellulosic fibres. Our BP 1439607 describes condensing a tetrakis (hydroxymethyl) phosphonium (hereinafter described as THP) salt, such as chloride, with a nitrogen containing compound such as urea to form a precondensate. Immediately before use as a flameproofing agent the solution obtained is treated with a base to pH 5–8 and the resulting aqueous solution of precondensate is applied to the fibres. The impregnated fibres are treated with ammonia to form on them a cross-linked polymer, conferring flame retardant properties on to the fibres.

Sometimes, particularly with THP sulphate, the condensation between the THP salt and urea does not occur satisfactorily, precipitates form and the aqueous precondensate gives unsatisfactory flameproofing.

We have found that addition of base before the condensation rather than after it can give a satisfactory aqueous condensate and flameproofing treatment.

The present invention provides a process for the manufacture of a condensation product from a tetrakis (hydroxymethyl) phosphonium salt and an amide of formula $(NH_2)_2CX$ wherein X represents an oxygen or sulphur atom which comprises adding a base to an aqueous solution of said tetrakis (hydroxymethyl) phosphonium salt to give an aqueous solution of a tetrakis (hydroxymethyl) phosphonium salt at pH 4–6.5 and then reacting said solution of phosphonium salt at pH 4–6.5 with said amide in the proportions of 1 mole of tetrakis (hydroxymethyl) phosphonium ion to 0.05–0.5 moles of amide to form an aqueous medium at pH 4–6 comprising a tetrakis (hydroxymethyl) phosphonium-amide condensation product.

In a particular aspect of the process of the invention, the base is added to a solution of the THP salt which has a pH less than 5 e.g. less than 3 or 2 such as 0.5–3 e.g. or 1–3 and especially 0.5–2 e.g. 1–2. The base is usually added before substantially any condensation with the amide has occurred, preferably before addition of any amide.

The salt may be one whose anion is derived from a monobasic acid e.g. an inorganic acid, such as a hydrohalic acid e.g. hydrochloric acid, nitric acid or an organic acid such as a carboxylic acid, e.g. an alkanoic acid or hydroxy alkanoic acid each of 1–6 carbon atoms such as formic, lactic, glycollic and acetic acids. Preferably, however, the anion is one derived from an acid with at least 2 acid groups e.g. a dibasic or tribasic one which may be organic e.g. an aliphatic di or tri carboxylic acid of 2–6 e.g. oxalic, malic and citric acids or inorganic e.g. phosphoric or most preferably sulphuric acid.

The THP salt is prepared in aqueous solution from phosphine, formaldehyde and an acid with the appropriate anion either directly or via tris (hydroxymethyl) phosphine, and hence the aqueous solution, which is the reaction product from such a preparation and which may be used as such in the condensation also contains residual amounts of these materials. The THP salt exists in solution as an equilibrium of THP salt, formaldehyde and free acid.

The amount of free acid and formaldehyde present will depend on the method of manufacture and on the nature of the acid anion. The amount of free formaldehyde present cannot be accurately determined since the analytical procedures disturb the equilibrium, but high levels are detrimental. The pH and formaldehyde content of the THP salt solution and the amount of amide to be added are such that without addition of the base to the THP salt solution to adjust the pH, a precipitate would form on adding the amide or at least by the end of the reaction of THP and amide. The process of the invention is particularly suitable for THP salt solutions of pH 1–2. The THP salt may be present in the aqueous solution for condensation in amounts of 10–85% e.g. 30–50% by weight (expressed as THP ion). For the avoidance of doubt the weight of THP ion given is based on the weight of the THP salt itself present, and does not include the weight of any unreacted starting materials or dissociation products.

The pH of the solution before condensation may be adjusted by addition of water soluble base as a solid or liquid or in aqueous solution. The base may be an inorganic compound such as the hydroxide, carbonate or bicarbonate of a Group IA metal such as sodium or potassium. It may, for example be sodium hydroxide. Alternatively the base may be an organic compound such as a tertiary amine e.g. a compound of formula $R_3N$ wherein each R group, which may be the same or different, represents an alkyl or hydroxy-alkyl group, preferably each of 1–4 carbon atoms. Examples of such amines are triethylamine and triethanolamine. Sufficient base is added to produce the solution of THP salt at a pH between 4 and 6.5, preferably 4–6 such as 4.5–6 e.g. 5–5.8. The pH falls during the condensation and the higher the proportion of amide to THP the higher should be the pH of the solution at the start of the condensation. The adjustment of pH occurs directly by mixing of base and THP salt solution to give the desired pH so that addition of too much base followed by addition of an acid, such as a salt which is a Lewis acid, is excluded.

The quantity of urea or thiourea added per mole of THP ion is 0.05 to 0.5 moles preferably 0.1 to 0.4 moles, preferably 0.2 to 0.3 moles e.g. about 0.25 moles. The amount of the amide added is often such that its concentration in the aqueous solution would be, if there were no condensation, 0.1–12%, e.g. 1–7% by weight.

The amide may be added as a solid to the aqueous solution of THP salt but is preferably added in aqueous solution.

The base is preferably dissolved in water and added gradually to the THP salt solution with continuous agitation, e.g. stirring, in order to avoid high local concentrations.

The condensation may be carried out by addition of all the amide in one portion to the aqueous THP solution. However preferably, and especially when the proportion of the amide to THP is high, e.g. 0.3–0.5:1, the amide is added in more than one proportion, or continuously, with progressive addition, stepwise or continuously, of the amide to a solution comprising THP-amide condensation product. However the amide is added, the mixing of the amide into the solution is carried out with continuous agitation e.g. by stirring of the aqueous solution to avoid high local concentrations of amide. The base needed to adjust the pH, may also be added at the same time as the amide, either separately or by addition of a mixture of amide and base; however preferably the base is added before the amide. It is possible to add the base and/or the amide directly to the THP solution rather than as solutions but this is not preferred.

The condensation reaction may be carried out at a temperature of 0° C. up to the boiling point of the aqueous solution. Advantageously, the temperature is adjusted at 10–40° C. first before addition of the amide, and then the amide added at 10° to the boiling point, e.g. 10°–40° C. The reaction may be completed by heating at 40° C. to the boiling point, e.g. 80° to the boiling point.

The reaction is usually carried out until the condensation is complete and there is substantially no free amide. The progress of the reaction may be monitored by periodic analysis of the solution for the free amide. Total reaction times of 20 mins to 24 hrs e.g. 30 mins to 5 hrs may be used, the shorter times being used with higher temperatures.

The condensation produces an aqueous medium at pH 4–6 comprising a THP-amide condensation product with a mole ratio of THP residues to amide residues of 1:0.05–0.5.

Our invention therefore provides an aqueous medium at pH 4–6 comprising a tetrakis (hydroxymethyl) phosphonium-amide condensation product with a mole ratio of tetrakis (hydroxymethyl) phosphonium residues to amide residues of 1:0.05–0.5 manufactured by adding a base to an aqueous solution of tetrakis (hydroxymethyl) phosphonium salt to give an aqueous solution of a tetrakis (hydroxymethyl) phosphonium salt at pH 4–6.5 and then reacting said solution of phosphonium salt at pH 4–6.5 with an amide of formula $(NH_2)_2CX$ wherein X represents an oxygen or sulphur atom in the proportions of 1 mole of tetrakis (hydroxymethyl) phosphonium ion to 0.05–0.5 moles of amide. Preferred THP-amide condensation products can be characterised by being capable of giving, on dilution with water as necessary, an aqueous solution containing 38% THP residues by weight with a viscosity measured at 20° C. of 4–6 cS, a pH of pH 4.5–5.6 e.g. 4.8–5.2, and usually a density of 1.26–1.28.

The medium is a solution with substantially no insoluble solids e.g. amide-formaldehyde polymer. The medium is preferably substantially free of halide, e.g. chloride unless the anion of the THP salt is a halide and also preferably substantially free of metal cations other than the small amount that may be added with the base.

The aqueous medium comprising THP-amide condensation product hereafter described as the aqueous condensate, is used for flameproofing textiles in particular those comprising cellulosic fibres. Thus the textiles may be made from cellulosic fibres, such as cotton, linen and viscose rayon, from wool fibres and from blends of these fibres with each other or with other fibres such as polyamides and polyesters. The aqueous condensate prepared in the condensation reaction may be used for flameproofing directly without adjustment of pH e.g. without addition of any base to increase the pH, but usually simply after dilution with water.

The aqueous condensate solutions may be used as such but advantageously they are mixed with surface active additives, such as wetting agents and softening agents to improve penetration by the flameproofing solution and improve the handle, respectively.

The aqueous medium may be applied to the textile fabric in a conventional manner, e.g. by padding. The fabric is usually impregnated to give a pick up of 10–30 g THP ion per 100 g of fabric. The impregnated fabric is dried to remove most of the water, followed by curing with ammonia, in one stage as in our British Patent 1439608, or in a two stage gaseous/aqueous process as in our British Patent 906314. The aqueous condensate may also be used in a heat cured flameproofing treatment, in which case it is necessary to add a suitable thermosetting or reactant resin to the treatment solution. Thus the invention also provides a process for flameproofing textiles preferably cellulosic textiles by impregnating the textiles with an aqueous medium comprising a tetrakis (hydroxymethyl) phosphonium-amide condensation product manufactured by the process of this invention, and treating the impregnated textiles in order to cure the condensation product to a cross-linked polymer, usually by curing with ammonia. A conventional oxidative after-treatment e.g. with hydrogen peroxide may be applied to the flameproofed textiles. Cellulosic textiles flameproofed by use of aqueous condensates from THP sulphate often have better handle and drape than those from condensates from the THP chloride with adjustment of the pH after, rather than before, the condensation, as in BP 1439607.

The invention is illustrated in the following examples, in which parts are by weight.

EXAMPLE 1

An aqueous solution of THP sulphate $[(HOCH_2)_4P]_2 SO_4$ was prepared from phosphine, aqueous formaldehyde and sulphuric acid. This product contained 55.8% THP$^+$ and had a pH of 2.7. 7.5 parts of sodium hydroxide (0.19 moles) were dissolved in 138.5 parts of water and added to 1000 parts of the THP sulphate solution (3.6 moles THP+) with stirring to give a solution of pH 5.6. 54 parts of urea (0.9 moles) were dissolved into 250 parts of water and added to the THP sulphate/caustic soda solution with stirring. The temperature of the solution was raised to 100° C. over 1 hour and maintained at this temperature for 1 hour before cooling. The condensate solution obtained was a clear liquid containing no suspended solids. The solution had a pH of 5.5, a density of 1.265 and a viscosity of 5.18 cS at 20° C. The THP+ content was shown by analysis to be 38.0% (by weight).

EXAMPLE 2

An aqueous solution of THP sulphate was prepared from phosphine, aqueous formaldehyde and sulphuric acid. This product contained 59.4% THP+ and had a pH of 1.6.

Part A. Comparative

A pair of mixtures were prepared using 141 parts THP sulphate solution (0.54 moles THP+) and 4 and 8.1 parts urea (0.066 and 0.135 moles) dissolved in water to give a total of 218 parts. In both cases a white precipitate was formed within a few minutes of mixing.

Part B

The experiments in part A were repeated but with addition of 2.7 parts sodium hydroxide (0.0675 moles) dissolved in 3.3 parts water, slowly with stirring, to the THPS solution before addition of urea so that the pH of the THPS solution was lifted to 5.6. Each urea solution was then added as in part A but no white precipitate formed and the condensation proceeded as in Ex. 1.

EXAMPLE 3

An aqueous condensate solution was prepared as described in example 1. This solution was diluted by adding 35 parts of water to 65 parts of condensate solution. The resultant solution had a density of 1.165, pH 5.6 and contained 24.7% THP+. Samples of cotton winceyette (154 g/m$^2$) and cotton drill (274 g/m$^2$) were padded in the diluted solution to give wet pick ups of 97.2% and 76.7% respectively. The fabrics were dried to approximately 12% moisture content and cured by treatment with gaseous ammonia. The fabrics were then washed on a jig using 15 ml/liter 100 vol hydrogen peroxide and 5 g/l sodium carbonate, rinsed well and dried. The fabrics showed weight increases of 15.1 and 11.1% respectively and both satisfied the flameproofing requirements of British Standard 3120 both before and after washing.

EXAMPLE 4

16 parts of sodium hydroxide (0.4 moles) dissolved in 290 parts of water were added to 1000 parts of the THP sulphate solution used in Example 2 (3.83 mole THP+) with stirring to give a solution of pH 5.9. 58 parts of urea (0.96 moles) were dissolved in 170 parts of water and added to the THP sulphate/caustic soda solution with stirring. The temperature of the solution was raised to 100° C. over 1 hour and maintained at this temperature for 1 hour before cooling. The condensate solution obtained was a clear liquid containing no suspended solids. The solution had a pH of 5.4, a density of 1.275 and a viscosity of 4.95 cS at 20° C. The THP$_{30}$ content was shown by analysis to be 37.9% (by weight).

This solution was diluted by adding 35 parts of water to 65 parts of condensate solution. The resultant solution had a density of 1.172, pH 5.4 and contained 24.6% THP+. Samples of cotton winceyette (154 g/m$^2$) and cotton drill (274 g/m$^2$) were padded in the diluted solution to give wet pick ups of 102.5% and 84.7% respectively. The fabrics were dried to approximately 12% moisture content and cured by treatment with gaseous ammonia. The fabrics were then washed on a jig using 15 ml/liter 100 vol hydrogen peroxide and 5 g/l sodium carbonate, rinsed well and dried. The fabrics showed weight increases of 14.7% and 10.7% respectively and both satisfied the flameproofing requirements of British Standard 3120 both before and after washing.

EXAMPLE 5

A solution of THP sulphate had the following analysis THP+ 57.9% wt, density 1.407, pH 0.7.

Part A

To an aqueous solution of the THP sulphate specified above, urea (5.8% by weight based on the weight of THP sulphate) was added in aqueous solution with stirring. A white precipitate formed within five minutes.

Part B

The experiment in Part A was repeated but, before the urea was added, there was added to the THP solution with stirring an aqueous solution of sodium hydroxide (2.4% by weight based on the weight of THP sulphate) to give a pH of 6.0 before the condensation. No precipitate was formed.

EXAMPLE 6

To 852 parts (3.18 moles) THP sulphate solution (as described in Example 5) in a reactor fitted with a reflux condenser were added with stirring a solution of 20 parts, (0.5 moles) sodium hydroxide dissolved in 150 parts of water to give a solution of pH 6.0. To this solution was added with stirring a solution of 48 parts (0.8 moles) urea dissolved in 255 parts of water. The reaction liquid was heated to 96° C. and the temperature maintained at 96°-100° C. for 1 hour. The liquid was then cooled to 40° C. and removed, as a solution of THP/urea condensation product of analysis THP+ 37.3% (wt) density 1.264, pH 5.2, viscosity 5.8 cS.

We claim:

1. In a process for the manufacture of a condensation product from a tetrakis(hydroxymethyl)phosphonium salt whose anion is derived from an acid having at least two acid groups and an amide selected from the group consisting of urea and thiourea the improvement which comprises adding a base to an aqueous solution of said tetrakis(hydroxymethyl)phosphonium salt to give an aqueous solution of a tetrakis(hydroxymethyl)phosphonium salt at pH 4-6.5 and then reacting said solution of phosphonium salt at pH 4-6.5 with said amide in the proportions of 1 mole of tetrakis(hydroxymethyl)phosphonium to 0.05-0.5 moles of amide to form an aqueous medium which is a solution with substantially no insoluble solids at pH 4-6 comprising a tetrakis(hydroxymethyl)phosphonium amide condensation product.

2. A process according to claim 1 in which the base is added to an aqueous solution of the tetrakis(hydroxymethyl)phosphonium salt which has a pH less than 5.

3. A process according to claim 2 in which the base is added to an aqueous solution of the tetrakis(hydroxymethyl)phosphonium salt which has a pH less than 3.

4. A process according to claim 3 in which the base is added to an aqueous solution of the tetrakis(hydroxymethyl)phosphonium salt which has a pH of 0.5-2.

5. A process according to claim 1 or claim 3 in which sufficient base is a led to produce the aqueous solution of tetrakis(hydroxymethyl)phosphonium salt at a pH of 4.5-6.

6. A process according to claim 5 in which sufficient base is added to produce the aqueous solution of tetrakis (hydroxymethyl) phosphonium salt at a pH of 5-5.8.

7. An aqueous medium at pH 4-6 comprising a tetrakis(hydroxymethyl)phosphonium-amide condensation product prepared by the process of claim 1.

8. A process according to claim 1 or 3 or 6 in which the acid is sulphuric acid.

9. A process according to claim 1 or 3 or 6 in which the amide is urea.

10. A process according to claim 1 in which the quantity of amide added per mole of tetrakis(hydroxymethyl)phosphonium ion is 0.1-0.4 moles.

11. A process according to claim 1 or 3 or 6 in which the quantity of amide added per mole of tetrakis(hydroxymethyl)phosphonium ion is 0.2-0.3 moles.

12. A process according to claim 1 in which the base is inorganic.

13. A process according to claim 12 in which the base is sodium hydroxide.

14. A process according to claim 1 or claim 3 in which the base is added before addition of any amide.

15. An aqueous medium which is a solution with substantially no insoluble solids at pH 4-6 comprising a tetrakis(hydroxymethyl)phosphonium-amide condensation product with a mole ratio of tetrakis(hydroxymethyl)phosphonium residues to amide residues of 1:0.05–0.5 manufactured by adding a base to an aqueous solution of tetrakis(hydroxymethyl)phosphonium salt whose anion is derived from an acid having at least two acid groups to give an aqueous solution of a tetrakis(hydroxymethyl)phosphonium salt at pH 4∝6.5 and then reacting said solution of phosphonium salt at pH 4–6.5 with an amide of formula $(NH_2)_2CX$ wherein X represents an oxygen or sulphur atom in the proportions of 1 mole of tetrakis(hydroxymethyl)phosphonium ion to 0.05–0.5 moles of amide.

16. A aqueous medium according to claim 15 the tetrakis(hydroxymethyl)phosphonium-amide condensation product in which is capable of giving an aqueous solution containing 38% tetrakis(hydroxymethyl)phosphonium residues by weight with a viscosity measured at 20° C. of 4–6 cS and a pH of 4.5–5.6.

17. The process according to claim 9 wherein said acid is sulphuric acid.

18. A process according to claim 17 wherein the quantity of amide added per mole of tetrakis(hydroxymethyl)phosphonium ion is 0.1–0.4 moles.

19. A process according to claim 17 wherein the quantity of amide added per mole of tetrakis(hydroxymethyl)phosphonium ion is 0.2–0.3 moles.

20. A process according to claim 11 wherein said acid is sulphuric acid.

21. A process according to claim 19 wherein the pH and the formaldehyde content of said aqueous solution of said tetrakis(hydroxymethyl)phosphonium salt and the amount of said amide which is added are such that without addition of said base to give a solution of pH 4–6.5, a precipitate would form during the reaction of said salt and said amide.

22. An aqueous medium according to claim 7 or 15 or 16 wherein said acid is sulphuric acid.

23. A process according to claim 18 wherein the pH of said aqueous solution of the tetrakis(hydroxymethyl)phosphonium salt immediately prior to addition of the base is less than 3 and wherein sufficient base is added to raise the pH of said solution to 5–5.8.

* * * * *